M. C. HART.
AUTOMOBILE TIRE CHAIN.
APPLICATION FILED OCT. 16, 1918.
1,338,772.  Patented May 4, 1920.
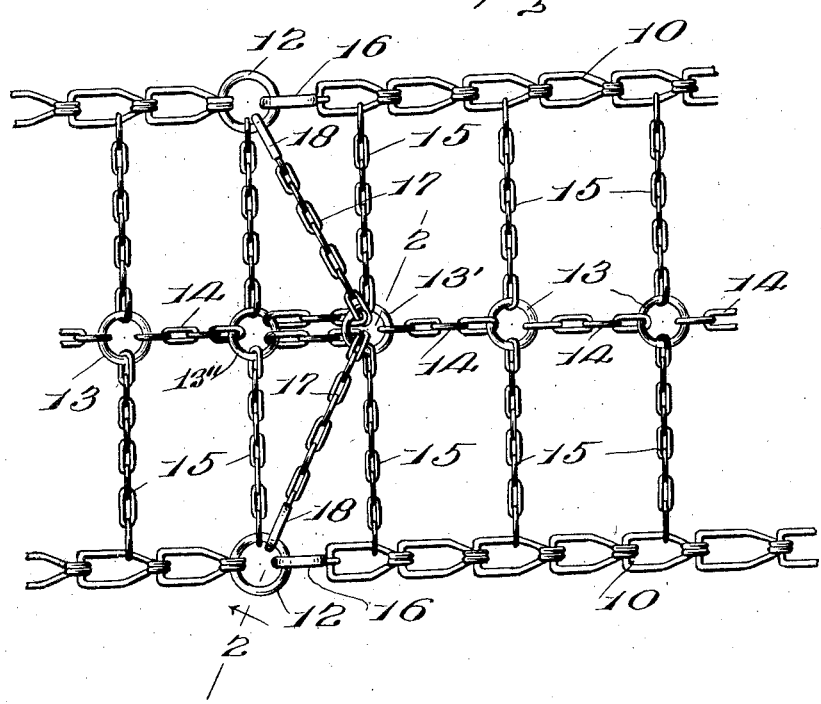

UNITED STATES PATENT OFFICE.

MORRIS C. HART, OF MOVILLE, IOWA.

AUTOMOBILE-TIRE CHAIN.

1,338,772.     Specification of Letters Patent.     Patented May 4, 1920.

Application filed October 16, 1918. Serial No. 258,340.

*To all whom it may concern:*

Be it known that I, MORRIS C. HART, a citizen of the United States, residing at Moville, in the county of Woodbury, State of Iowa, have invented certain new and useful Improvements in Automobile-Tire Chains; and I do hereby declare the following to be a full, clear, and exact description of the invention, such as will enable others skilled in the art to which it appertains to make and use the same.

This invention relates to new and useful improvements in chains and particularly to anti-skid chains for automobile tires.

One object of the present invention is to provide a novel and improved chain for an automobile tire whereby the traction is increased to a large extent while at the same time the danger of skidding or side slipping of the tire is reduced to a minimum.

Another object of the present invention is to provide a chain which can be easily and quickly applied to or removed from a tire, and one which will more properly cling to the tire without damage to the tire.

Other objects and advantages will be apparent from the following description when taken in connection with the accompanying drawing.

In the drawing:

The figure is a plan view of a section of a chain made in accordance with my invention.

Referring particularly to the accompanying drawing 10 represents a pair of chains disposed in parallel relation and arranged to extend around the side portions of the tread of a tire. At one point in each of these chains there is disposed the circular link or ring 12. Disposed between the chains 10, and arranged in parallel relation thereto, is the series of rings 13. Connected to these rings and extending longitudinally between the chains 10 is a mid-chain 14. Transverse chains 15 connect the rings 13 of the mid-chain with links of the side chains, as shown. Carried by each of the rings 12 is a hook member 16 which is detachably engaged with one of the links at the other end of the chain 10. This constitutes the connecting means for the ends of the chains 10 for applying and removing the device. Chains 17 have their intermediate portions engaged through the link 13' and each has one end permanently secured to the ring 13'', while their other ends are extended diagonally from the ring 13' to the rings 12 where they are engaged with the hooks 18, carried by said rings.

There is thus produced an anti-skid chain which consists of three parallel chains and transverse chains connected thereto, whereby the traction is greatly increased, and the side slipping or skidding is effectively prevented.

With the present arrangement of the intermediate longitudinal chains, no creeping can take place as the said chains are held to the side and central chains or transverse chains. Furthermore, the double chains permit a greater depth of biting action to reach harder or more solid ground in the road surface, with the result that considerably greater tractive action is obtained.

The hooks 18, carried by the rings 12, are so arranged and constructed that the chains 14 can be adjusted therewith, thus permitting the chain to be readily fitted to tires of different sizes, and also to permit the proper tightening of the same on the tire. Should the chain appear too loose, the chains 14 are slipped through the ring 13' and another link in each chain engaged with the hooks 18, until the device properly and snugly fits the tire without danger of creeping.

What is claimed is:

An anti-skid structure including a pair of parallel side chains each having a ring at one end and a hook at the other end, a mid-chain disposed longitudinally and centrally between said parallel chains and having two rings, transverse chains connecting the mid and side chains, and chains having their intermediate portions engaged through one of the central rings and each having an end permanently secured to the other ring and its other end detachably secured to one of the first-named rings.

In testimony whereof, I affix my signature, in the presence of two witnesses.

MORRIS C. HART.

Witnesses:
ETHEL THARP,
R. B. LYLE.